J. W. Hayes,

Fruit Basket,

Reissued Mar. 10, 1868.

No. 2,894.

Witnesses;
Isaac Hunt
Stephen Evans

Inventor;
J. W. Hayes

UNITED STATES PATENT OFFICE.

JABEZ W. HAYES, OF NEWARK, NEW JERSEY.

IMPROVED FRUIT-BOX OR BASKET.

Specification forming part of Letters Patent No. 15,514, dated August 12, 1856; Reissue No. 2,894, dated March 10, 1868.

*To all whom it may concern:*

Be it known that I, JABEZ W. HAYES, of Newark, in the county of Essex and State of New Jersey, have invented, made, and applied to use a certain new and useful Improvement in Baskets or Boxes for Holding Berries or other Fruit; and I do hereby declare the following to be a correct, full, and clear description of the same, reference being had to the annexed drawings, making part of this specification, wherein—

Figure 1:
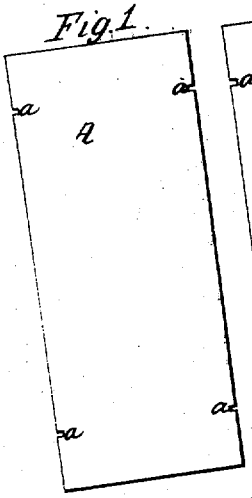
Figure 2:
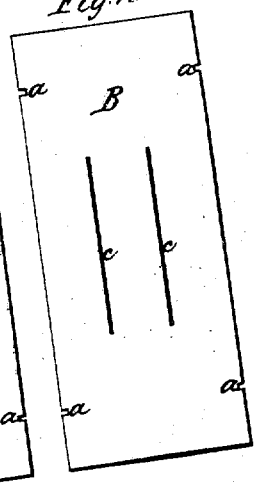
Figure 4:
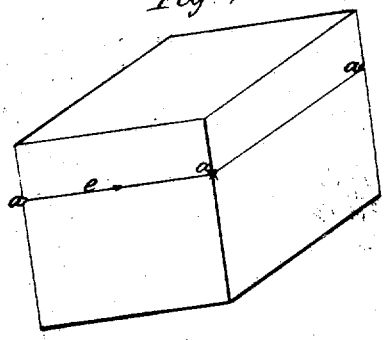
Figure 3:
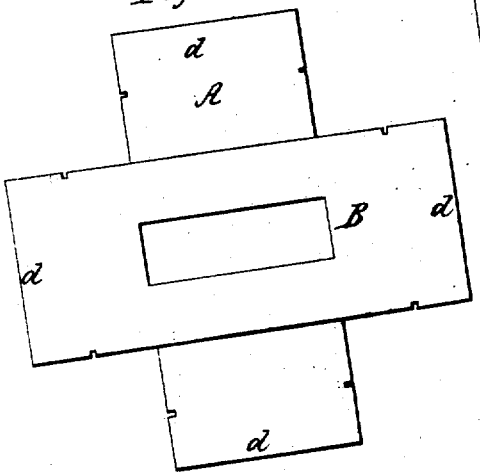

Figure 1 is a view of a veneer adapted to the making of my basket. Fig. 2 is a similar view of the second piece of veneer employed in making said basket. Fig. 3 represents the said two pieces of veneer laid across each other; and Fig. 4 is a perspective view of the box or basket complete.

Similar letters denote the same parts.

The object of this invention is to produce a basket or box for berries or other fruit that is very cheap and easily made, and hence may be sold or given away without charge to the purchaser of the berries or fruit, thereby rendering it unnecessary to transfer the fruit from the box or basket when sold.

The nature of my said invention consists in a box or basket formed of two pieces of veneer or thin laminæ of wood laid across each other and turned up to form the sides of the box or basket. By this construction the bottom of the box or basket is made of two thicknesses of such veneer secured together, and the sides are of only one thickness turned up at right angles, or nearly so, to the bottom, and composed of the end portions of the pieces of veneer that compose the bottom. My invention enables me to make a very cheap box or basket possessed of great strength, and especially adapted to the before-mentioned purposes.

The laminæ or pieces of veneer A and B are of a width corresponding nearly to the size of the bottom of the box or basket, say from two to four inches wide, more or less, and of a length equal to the width of the bottom added to the height of the two sides. The veneers, when laid across each other, project at their ends, as seen in Fig. 3, leaving the sides single and the bottom double when the portions *d d d d* are bent up at right angles, or nearly so, to form the box, as seen in Fig. 4.

I have shown the veneer B as formed with longitudinal incisions *c c*, of a length to allow the veneer A to be introduced, as illustrated in Fig. 3, so that the two thicknesses forming the bottom may thereby be held together with facility.

The sides of the basket or box, when bent up at right angles, or nearly so, to the bottom, may be connected together or secured in place by any convenient means. I have, however, shown a cord, *e*, as passed around the said box or basket, and, entering the notches at *a*, is prevented from slipping when the box or basket is in use.

What I claim, and desire to secure by Letters Patent, is—

1. A box or basket formed of veneers or laminæ of wood laid across each other and turned up to form the sides, so that the bottom is made of two thicknesses secured together, substantially as specified, and the sides of single thicknesses.

2. A box or basket formed of veneers or laminæ of wood crossing each other at the bottom and turned up to form the sides, in combination with a cord or its equivalent passing around the sides to hold them together, substantially as set forth.

3. A box or basket in which one lamina of wood forms two of the sides and one thickness of the double bottom, substantially as set forth.

In witness whereof I have hereunto set my signature this 18th day of December, 1867.

JABEZ W. HAYES.

Witnesses:

CHAS. HAYES,
JOHN H. FULLER.